US011096072B2

(12) United States Patent
Shen (10) Patent No.: US 11,096,072 B2
(45) Date of Patent: Aug. 17, 2021

(54) METHOD FOR IMPROVING WI-FI PERFORMANCE AND TERMINAL

(71) Applicant: HUAWEI TECHNOLOGIES CO., LTD., Guangdong (CN)

(72) Inventor: Yu Shen, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 21 days.

(21) Appl. No.: 16/592,083

(22) Filed: Oct. 3, 2019

(65) Prior Publication Data

US 2020/0037177 A1 Jan. 30, 2020

Related U.S. Application Data

(63) Continuation of application No. PCT/CN2018/080817, filed on Mar. 28, 2018.

(30) Foreign Application Priority Data

Apr. 7, 2017 (CN) .......................... 201710224641.9

(51) Int. Cl.
*H04W 56/00* (2009.01)
*H04W 24/02* (2009.01)
*H04B 17/318* (2015.01)
*H04W 84/12* (2009.01)

(52) U.S. Cl.
CPC .......... *H04W 24/02* (2013.01); *H04B 17/318* (2015.01); *H04W 84/12* (2013.01)

(58) Field of Classification Search
CPC ..... H04W 24/02; H04W 84/12; H04B 17/318
(Continued)

(56) References Cited

U.S. PATENT DOCUMENTS

2005/0148334 A1* 7/2005 Peeters ............... H04M 1/6091
455/436
2006/0094364 A1 5/2006 Hirota et al.
(Continued)

FOREIGN PATENT DOCUMENTS

CN 102315855 A 1/2012
CN 103297078 A 9/2013
(Continued)

OTHER PUBLICATIONS

Office Action dated Jan. 16, 2019, issued in counterpart CN Application No. 201710224641.9 (6 pages).
(Continued)

*Primary Examiner* — Sai Ming Chan
(74) *Attorney, Agent, or Firm* — Westerman, Hattori, Daniels & Adrian, LLP (57) ABSTRACT

A method for improving Wi-Fi performance and a terminal the method includes determining, by a terminal, whether a currently working Wi-Fi channel is interfered by an HDMI signal and whether strength of a received Wi-Fi signal is less than or equal to a preset signal strength threshold, where the terminal is configured with a Wi-Fi module and an HDMI port; and if the currently working Wi-Fi channel is interfered by the HDMI signal, and the strength of the received Wi-Fi signal is less than or equal to the preset signal strength threshold, controlling, by the terminal, a Wi-Fi antenna most greatly interfered by the HDMI signal to stop receiving/sending a signal. According to the embodiments of the present disclosure, interference from the HDMI signal to the Wi-Fi signal can be reduced, and Wi-Fi performance can be improved without increasing hardware complexity and hardware costs.

8 Claims, 5 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2011/0274221 A1 | 11/2011 | Yang et al. | |
| 2012/0142296 A1* | 6/2012 | Cotterill | H04B 7/0805 455/230 |
| 2013/0229994 A1 | 9/2013 | Kim et al. | |
| 2015/0133185 A1 | 5/2015 | Chen et al. | |
| 2015/0271667 A1* | 9/2015 | Bernsen | H04W 12/04031 713/171 |
| 2020/0037177 A1 | 1/2020 | Shen | |

FOREIGN PATENT DOCUMENTS

| | | |
|---|---|---|
| CN | 103490787 A | 1/2014 |
| CN | 103957439 A | 7/2014 |
| CN | 105743602 A | 7/2016 |
| CN | 105847725 A | 8/2016 |
| CN | 106375048 A | 2/2017 |
| CN | 106413072 A | 2/2017 |
| CN | 107222285 A | 9/2017 |
| JP | 200879117 A | 4/2008 |
| WO | 2010023630 A2 | 3/2010 |

OTHER PUBLICATIONS

Office Action dated Nov. 7, 2019, issued in counterpart CN Application No. 201710224641.9, with English translation (13 pages).
Extended Search Report dated Jan. 30, 2020, issued in counterpart EP Application No. 18781891.9 (8 pages).
IEEE 802.11-12/0610r0 George Calce et al.,"Non-TIM Stations in 11ah",IEEE, dated May 2012 (11 pages).
International Search Report dated Jun. 8, 2018, issued in counterpart CN Application No. PCT/CN2018/080817 (10 pages).

* cited by examiner

METHOD FOR IMPROVING WI-FI PERFORMANCE AND TERMINAL

CROSS-REFERENCE TO RELATED APPLICATIONS

This application is a continuation of International Application No. PCT/CN2018/080817, filed on Mar. 28, 2018, which claims priority to Chinese Patent Application No. 201710224641.9, filed on Apr. 7, 2017. The disclosures of the aforementioned applications are hereby incorporated by reference in their entireties.

TECHNICAL FIELD

This application relates to the field of intelligent terminals, and in particular, to a method for improving Wi-Fi performance and a terminal.

BACKGROUND

As a set-top box product is gradually entering a 4K ultra high definition (4K UHD) era, a high definition multimedia interface (HDMI) has become a mainstream interface of a high definition video. The set-top box is connected to a TV set by using an HDMI port, to output decoded high definition data to the TV set. With the development of the TV set and networks, the set-top box is further configured with a wireless fidelity (Wi-Fi) interface. In an actual use process, when high definition video data is transmitted by using the HDMI port, a frequency-multiplication signal of an HDMI clock signal is located on a radio frequency band corresponding to 5G or 2.4G Wi-Fi, Wi-Fi performance and causing mosaic or frame freezing to appear in a process of video program playing, thereby affecting user experience. Currently, if an HDMI signal and a Wi-Fi signal of a set-top box video product interfere with each other, a common solution is adding a shielding case in an HDMI signal cable part to reduce interference to the Wi-Fi signal. The existing solution increases hardware complexity and product hardware costs, thereby lowering product competitiveness.

SUMMARY

Embodiments of the present disclosure provide a method for improving Wi-Fi performance and a terminal, so as to reduce interference from an HDMI signal to a Wi-Fi signal and improve Wi-Fi performance without increasing hardware complexity and hardware costs.

The embodiments of the present disclosure may be specifically implemented by using the following technical solutions:

According to a first aspect, an embodiment of the present disclosure provides a method for improving Wi-Fi performance. The method includes: determining, by a terminal, whether a currently working Wi-Fi channel is interfered by an HDMI signal and whether strength of a received Wi-Fi signal is less than or equal to a preset signal strength threshold, where the terminal is configured with a Wi-Fi module and an HDMI port; and if the currently working Wi-Fi channel is interfered by the HDMI signal, and the strength of the received Wi-Fi signal is less than or equal to the preset signal strength threshold, controlling, by the terminal, a Wi-Fi antenna most greatly interfered by the HDMI signal to stop receiving/sending a signal. According to this embodiment of the present disclosure, interference from the HDMI signal to the Wi-Fi signal can be reduced by disabling a specific antenna, and Wi-Fi performance is improved without increasing hardware complexity and hardware costs.

In a possible design, the determining, by a terminal, whether a currently working Wi-Fi channel is interfered by an HDMI signal includes: determining, by the terminal based on the currently working Wi-Fi channel, resolution of a video signal output by the HDMI port of the terminal, and frequency multiplication of a clock signal output by the HDMI port of the terminal, whether the currently working Wi-Fi channel is interfered by the HDMI signal. In this embodiment of the present disclosure, the terminal may determine, based on the foregoing related parameters, whether the currently working Wi-Fi channel is interfered by the HDMI signal, which is easy to operate.

In a possible design, the currently working Wi-Fi channel is determined by the terminal based on a beacon frame sent by a wireless access point.

In a possible design, the Wi-Fi antenna most greatly interfered by the HDMI signal is an antenna closest to the HDMI port of the terminal. In this embodiment of the present disclosure, the antenna most greatly interfered by the HDMI signal may be determined based on distribution locations of Wi-Fi antennas on the terminal, which is easy to operate.

In a possible design, after the controlling, by the terminal, a Wi-Fi antenna most greatly interfered by the HDMI signal to stop receiving/sending a signal, the method further includes: determining, by the terminal, whether the currently working Wi-Fi channel is interfered by the HDMI signal, and whether the strength of the received Wi-Fi signal is less than or equal to the preset signal strength threshold; and if the currently working Wi-Fi channel is not interfered by the HDMI signal, or the strength of the received Wi-Fi signal is greater than the preset signal strength threshold, controlling, by the terminal, the Wi-Fi antenna most greatly interfered by the HDMI signal to start receiving/sending a signal. In this embodiment of the present disclosure, after disabling the Wi-Fi antenna most greatly interfered by the HDMI signal, the terminal may further enable the Wi-Fi antenna after interference is eliminated, so as to improve user experience of video watching.

According to a second aspect, an embodiment of the present disclosure further provides a terminal, and the terminal implements a function of the terminal in the foregoing method for improving Wi-Fi performance according to the first aspect. Therefore, a beneficial effect of the method for improving Wi-Fi performance according to the first aspect can also be implemented. The function of the terminal may be implemented by hardware, or may be implemented by hardware by executing corresponding software. The hardware or the software includes at least one module corresponding to the function.

In a possible design, the terminal includes a processing unit. The processing unit is configured to determine whether a currently working Wi-Fi channel is interfered by an HDMI signal and whether strength of a received Wi-Fi signal is less than or equal to a preset signal strength threshold, where the terminal is configured with a Wi-Fi module and an HDMI port: and if the currently working Wi-Fi channel is interfered by the HDMI signal and the strength of the received Wi-Fi signal is less than or equal to the preset signal strength threshold, the processing unit is further configured to control a Wi-Fi antenna most greatly interfered by the HDMI signal to stop receiving/sending a signal. According to this embodiment of the present disclosure, interference from the HDMI signal to the Wi-Fi signal can be reduced by disabling a specific antenna, and Wi-Fi performance is improved without increasing hardware complexity and hardware costs.

In a possible design, that the processing unit is configured to determine whether the currently working Wi-Fi channel is interfered by the HDMI signal includes: determining, based on the currently working Wi-Fi channel, resolution of a video signal output by the HDMI port of the terminal, and frequency multiplication of a clock signal output by the HDMI port of the terminal, whether the currently working Wi-Fi channel is interfered by the HDMI signal. In this embodiment of the present disclosure, the terminal may determine, based on the foregoing related parameters, whether the currently working Wi-Fi channel is interfered by the HDMI signal, which is easy to operate.

In a possible design, the currently working Wi-Fi channel is determined by the terminal based on a beacon frame sent by a wireless access point.

In a possible design, the Wi-Fi antenna most greatly interfered by the HDMI signal is an antenna closest to the HDMI port of the terminal. In this embodiment of the present disclosure, the antenna most greatly interfered by the HDMI signal may be determined based on distribution locations of Wi-Fi antennas on the terminal, which is easy to operate.

In a possible design, after controlling the Wi-Fi antenna most greatly interfered by the HDMI signal to stop receiving/sending a signal, the processing unit is further configured to: determine whether the currently working Wi-Fi channel is interfered by the HDMI signal, and whether the strength of the received Wi-Fi signal is less than or equal to the preset signal strength threshold; and if the currently working Wi-Fi channel is not interfered by the HDMI signal, or the strength of the received Wi-Fi signal is greater than the preset signal strength threshold, control the Wi-Fi antenna most greatly interfered by the HDMI signal to start receiving/sending a signal. In this embodiment of the present disclosure, after disabling the Wi-Fi antenna most greatly interfered by the HDMI signal, the terminal may further enable the Wi-Fi antenna after interference is eliminated, so as to improve user experience of video watching.

According to a third aspect, an embodiment of the present disclosure further provides a terminal, and the terminal implements a function of the terminal in the foregoing method for improving Wi-Fi performance according to the first aspect. Therefore, a beneficial effect of the method for improving Wi-Fi performance according to the first aspect can also be implemented. The function of the terminal may be implemented by hardware, or may be implemented by hardware by executing corresponding software. The hardware or the software includes at least one module corresponding to the function. The terminal includes a processor, configured to implement a function corresponding to the processing unit in the terminal according to the second aspect.

According to a fourth aspect, an embodiment of the present disclosure provides a computer storage medium, and the computer storage medium is configured to store a computer software instruction used by the terminal, and includes a program designed for the terminal to execute the first aspect.

According to the method embodiment of the present disclosure, the terminal may dynamically adjust an antenna, so as to enhance interference immunity of an entire system. Compared with a conventional hardware shielding manner, this embodiment of the present disclosure does not require any additional shielding case or device, so that hardware costs are reduced, and Wi-Fi performance can be improved without increasing hardware costs and hardware complexity.

DESCRIPTION OF EMBODIMENTS

It should be noted that, in each embodiment of the present disclosure, for example, a terminal is a set-top box for description. In another implementation, the terminal may alternatively be any other video terminal product configured with a Wi-Fi module and an HDMI port.

Figure 1:
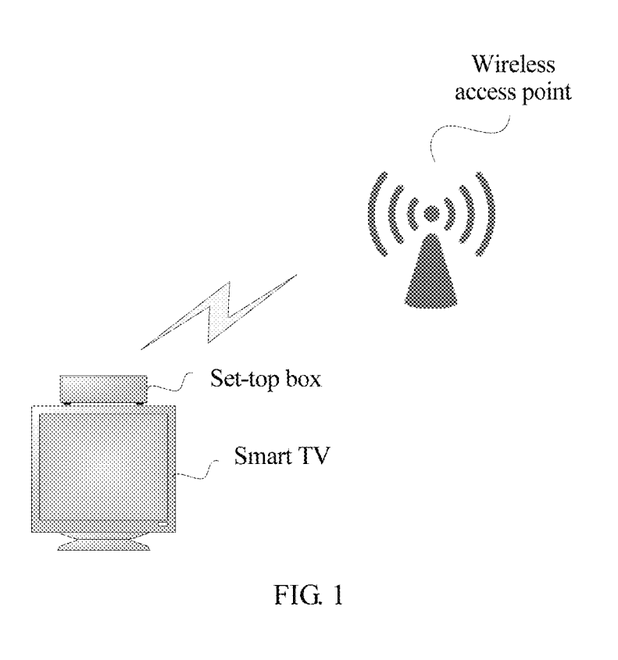
FIG. 1 is a schematic diagram of a scenario applicable to an embodiment of the present disclosure.

FIG. 1 is a schematic diagram of a scenario applicable to an embodiment of the present disclosure. In FIG. 1, a set-top box is connected to a wireless access point (AP) by using a Wi-Fi module. After the set-top box is successfully connected to the wireless access point, the set-top box can access a network for transmitting a Wi-Fi signal with the AP. The set-top box transmits an HDMI signal with a smart TV by using the HDMI port, so as to send audio and video data obtained from the AP to the smart TV for playing. The wireless access point may be a router, and the smart TV may be an IPTV set.

Figure 2:
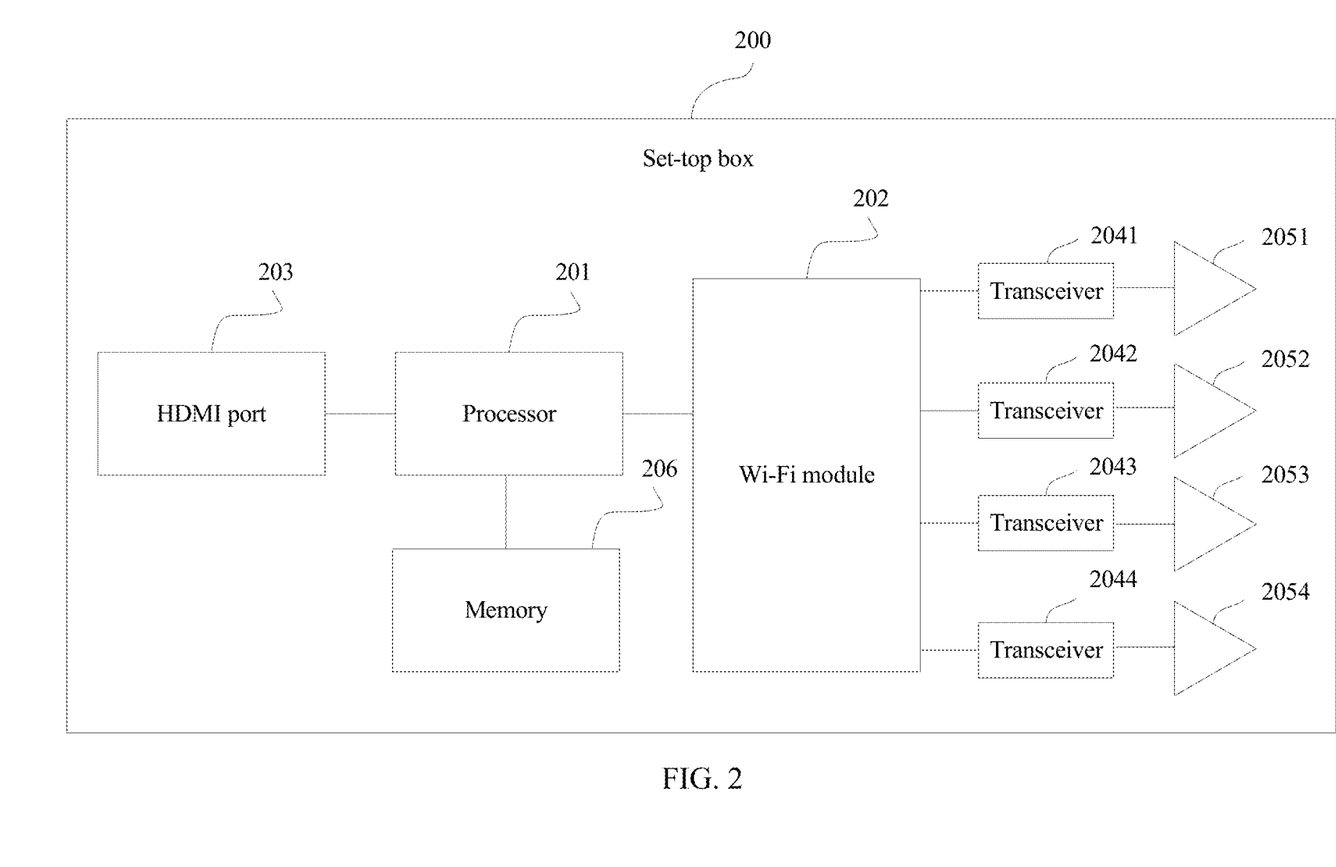
FIG. 2 is a schematic structural diagram of a set-top box shown in FIG. 1.

FIG. 2 is a schematic structural diagram of the set-top box shown in FIG. 1. The set-top box 200 includes: a processor 201, a Wi-Fi module 202, an HDMI port 203, a transceiver 2041, a transceiver 2042, a transceiver 2043, a transceiver 2044, a Wi-Fi antenna 2051, a Wi-Fi antenna 2052, a Wi-Fi antenna 2053, a Wi-Fi antenna 2054, and a memory 206 (one or more computer readable storage media).

The processor 201 may be integrated with one or more central processing units (CPU), a clock module, and a power management module. The clock module is mainly configured to generate a clock required for data transmission and time sequence control for the processor 201. The power management module is mainly configured to provide a stable and high-precision voltage for the processor 201, the Wi-Fi module 202, and the like.

The Wi-Fi module 202 is configured to perform data processing, for example, transmission processing (such as modulation and encoding) on data generated by the processor 201, or receiving processing (such as demodulation and decoding) on a radio signal (such as audio and video data) sent by an AP and received by the Wi-Fi antenna. In a specific implementation, the Wi-Fi module 202 may be a Wi-Fi chip or the like.

The transceiver is configured to transmit data processed by the Wi-Fi module 202 to the Wi-Fi antenna for transmission, and is further configured to: filter a radio signal received by the Wi-Fi antenna, and transmit filtered data to the Wi-Fi module 202. In a specific implementation, there may be one or more transceivers. In this embodiment of the present disclosure, for example, there are four transceivers for description, and each transceiver corresponds to one Wi-Fi antenna. In another implementation, one transceiver may alternatively correspond to a plurality of Wi-Fi antennas. This is not specifically limited in this embodiment of the present disclosure.

The Wi-Fi antenna is configured to convert electromagnetic energy in a transmission line into an electromagnetic wave in free space, or convert an electromagnetic wave in free space into electromagnetic energy in a transmission line. In a specific implementation, there may be one or more Wi-Fi antennas. In this embodiment of the present disclosure, for example, there are four Wi-Fi antennas for description. The set-top box 200 is connected to the AP by using the Wi-Fi antenna. After the set-top box 200 is successfully connected to the AP, the set-top box 200 can access a network for transmitting wireless data with the AP.

The set-top box 200 is connected to a smart TV by using the HDMI port 203, so as to send audio and video data obtained from the AP to the smart TV for playing.

The memory 206 is coupled to the processor 201 and configured to store various software programs and/or a plurality of sets of instructions. In a specific implementation, the memory 206 may include a high-speed random access memory, or may include a nonvolatile memory, such as one or more magnetic disk storage devices, a flash storage device, or another nonvolatile solid-state storage device. The memory 206 may store a network communication program, and the network communication program may be used to communicate with one or more terminal devices, such as an AP. The memory 206 may exist independently and is connected to the processor 201 by using a bus. Alternatively, the memory 206 may be integrated with the processor 201. In this embodiment of the present disclosure, the memory 206 may store an identifier of a Wi-Fi antenna closest to an installation location of the HDMI port 203, where the identifier of the Wi-Fi antenna closest to the HDMI port 203 is burnt into the memory 206 in advance. The antenna closest to the HDMI port 203 is an antenna most greatly interfered by an HDMI signal.

Figure 3:
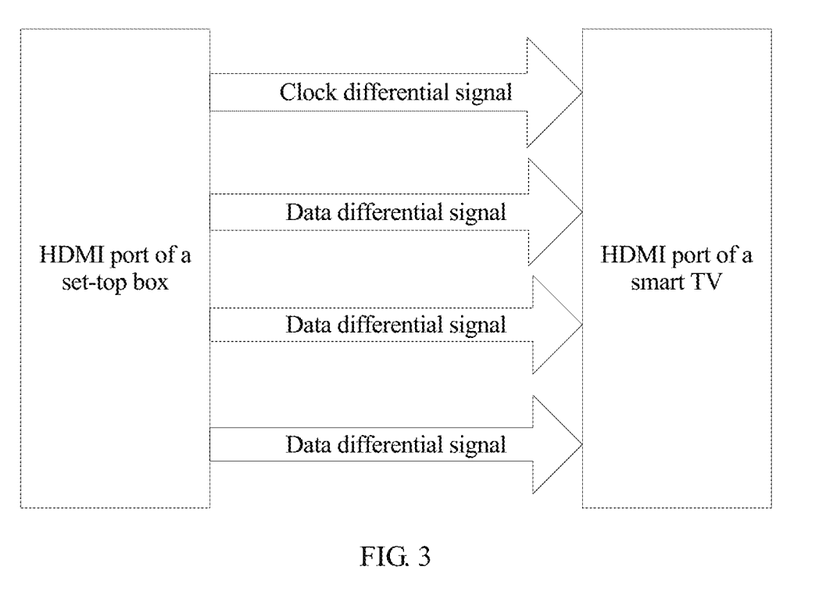
FIG. 3 is a schematic diagram of data transmission of an HDMI port according to an embodiment of the present disclosure.

It should be noted that the HDMI port may simultaneously transmit audio and video signals. FIG. 3 is a schematic diagram of transmitting an HDMI signal between a set-top box and a smart TV. A communications interface of the HDMI port includes four groups of differential signals: one group of clock differential signals (TMDS Clock Channel) and three groups of data differential signals (TMDS Channel 0, TMDS Channel 1, and TMDS Channel 2). In each clock cycle, audio and video signals are transmitted by using the three groups of data differential signals. Because of different video resolution, different color depths, and different color arrangements, different transmission rates of video data are generated, and the clock signals of the HDMI port also have different clock rates. Table 1 lists current mainstream video resolution, different video parameter configurations, and corresponding differential clock rates and related data rates.

TABLE 1

| Resolution | Refresh rate | Color arrangement | Color depth | Single channel data rate | Clock rate ratio | Clock frequency |
|---|---|---|---|---|---|---|
| 720P | 50/60 | [4:4:4] and [4:2:2] | 8 | 0.743 Gbps | 10 | 74.33 MHZ |
| 1080I | 50/60 | [4:4:4] and [4:2:2] | 8 | 0.743 Gbps | 10 | 74.33 MHZ |
| 1080P | 25/30 | [4:4:4] and [4:2:2] | 8 | 0.743 Gbps | 10 | 74.33 MHZ |
| 1080P | 50/60 | [4:4:4] and [4:2:2] | 8 | 1.487 Gbps | 10 | 148.67 MHZ |
| 2160P | 25/30 | [4:4:4] and [4:2:2] | 8 | 2.97 Gbps | 10 | 297.00 MHZ |
| 2160P | 25/30 | [4:4:4] | 10 | 3.713 Gbps | 40 | 92.83 MHZ |
| 2160P | 50/60 | [4:2:0] | 8 | 2.97 Gbps | 10 | 297.00 MHZ |
| 2160P | 50/60 | [4:2:0] | 10 | 3.713 Gbps | 40 | 92.83 MHZ |

It may be learned from Table 1 that, for different video resolution, data transmission rates of data channels and clock frequencies of clock signals corresponding to the HDMI port have different frequency values.

As video resolution develops from standard definition, high definition, to current 4K UHD ultra high definition, a video stream keeps increasing, and a requirement for a Wi-Fi transmission capability is also increasing. A Wi-Fi specification is gradually changing from single-antenna to dual-antenna and multiple-antenna. In an actual use process, when high-definition video data is transmitted by using the HDMI port, a frequency-multiplication signal of an HDMI clock signal is located on a radio frequency band corresponding to 5G or 2.4G Wi-Fi, interfering with Wi-Fi performance. Using 5G Wi-Fi as an example for description, for an interference relationship between an HDMI clock signal rate and each channel of a Wi-Fi wireless communication band, refer to Table 2.

TABLE 2

| Country | Bandwidth | 5G band 1 (5170 MHZ-5250 MHZ) | | | | 5G band 2 (5250 MHZ-5330 MHZ) | | | | 5G band 3 (5490 MHZ-5730 MHZ) | | | |
|---|---|---|---|---|---|---|---|---|---|---|---|---|---|
| | | CH-36 5180M | CH-40 5200M | CH-44 5220M | CH-48 5240M | CH-52 5260M | CH-56 5280M | CH-60 5300M | CH-64 5320M | CH-100 5500M | CH-104 5520M | CH-108 5540M | CH-112 5560M |
| North America | 20 MHZ | CH36 | CH40 | CH44 | CH48 | CH52 | CH56 | CH60 | CH64 | CH100 | CH104 | CH108 | CH112 |
| | 40 MHZ | CH38 | | CH46 | | CH54 | | CH62 | | CH102 | | CH110 | |
| | 80 MHZ | CH42 | | | | CH58 | | | | CH106 | | | |
| | 160 MHZ | | | | | CH50 | | | | | | CH114 | |
| Europe | 20 MHZ | CH36 | CH40 | CH44 | CH48 | CH52 | CH56 | CH60 | CH64 | CH100 | CH104 | CH108 | CH112 |
| | 40 MHZ | CH38 | | CH46 | | CH54 | | CH62 | | CH102 | | CH110 | |
| | 80 MHZ | CH42 | | | | CH58 | | | | CH106 | | | |
| | 160 MHZ | | | | | CH50 | | | | | | CH114 | |

TABLE 2-continued

| Country | Bandwidth | | | | | | | |
|---------|-----------|---|---|---|---|---|---|---|
| China | 20 MHZ | CH36 | CH40 | CH44 | CH48 | CH52 | CH56 | CH60 | CH64 |
| | 40 MHZ | | | | | | | |
| | 80 MHZ | | CH42 | | | | CH58 | |
| | 160 MHZ | | | | CH50 | | | |
| 720P_60 HZ_8 bit_ 74.33 MHZ | | | 70 frequency multiplication | | | 71 frequency multiplication | | 74 frequency multiplication | |
| 1080I_60 HZ_8 bit_ 74.33 MHZ | | | 70 frequency multiplication | | | 71 frequency multiplication | | 74 frequency multiplication | |
| 1080P_30 HZ_8 bit_ 74.33 MHZ | | | 70 frequency multiplication | | | 71 frequency multiplication | | 74 frequency multiplication | |
| 1080P_60 HZ_8 bit_ 148.67 MHZ | | | 35 frequency multiplication | | | | | 37 frequency multiplication | |
| 2160P_30 HZ_10 bit_ 92.83 MHZ | | | 56 frequency multiplication | | | 57 frequency multiplication | | 60 frequency multiplication | |
| 2160P_60 HZ_10 bit_ 92.83 MHZ | | | 56 frequency multiplication | | | 57 frequency multiplication | | 60 frequency multiplication | |
| 2160P_30 HZ_8 bit_ 297.00 MHZ | | | | | | | | | |
| 2160P_60 HZ_8 bit_ 297.00 MHZ | | | | | | | | | |

| | | 5G band 3 (5490 MHZ-5730 MHZ) | | | | | | | | 5G band 4 (5735 MHZ-5835 MHZ) | | | | |
|---|---|---|---|---|---|---|---|---|---|---|---|---|---|---|
| Country | Bandwidth | CH-116 5580M | CH-120 5600M | CH-124 5620M | CH-128 5640M | CH-132 5660M | CH-136 5680M | CH-140 5700M | CH-144 5720M | CH-149 5745M | CH-153 5765M | CH-157 5785M | CH-161 5805M | CH-165 5825M |
| North America | 20 MHZ | CH116 | CH120 | CH124 | CH128 | CH132 | CH136 | CH140 | CH144 | CH149 | CH153 | CH157 | CH161 | CH165 |
| | 40 MHZ | CH118 | | CH126 | | CH134 | | CH142 | | CH151 | | CH159 | | |
| | 80 MHZ | | CH122 | | | CH138 | | | | | CH155 | | | |
| | 160 MHZ | | | | | | | | | | | | | |
| Europe | 20 MHZ | CH116 | CH120 | CH124 | CH128 | CH132 | CH136 | CH140 | | | | | | |
| | 40 MHZ | CH118 | | CH126 | | CH134 | | | | | | | | |
| | 80 MHZ | | CH122 | | | | | | | | | | | |
| | 160 MHZ | | | | | | | | | | | | | |
| China | 20 MHZ | | | | | | | | | CH149 | CH153 | CH157 | CH161 | CH165 |
| | 40 MHZ | | | | | | | | | CH151 | | CH159 | | |
| | 80 MHZ | | | | | | | | | | CH155 | | | |
| | 160 MHZ | | | | | | | | | | | | | |
| 720P_60 HZ_8 bit_ 74.33 MHZ | | 75 frequency multiplication | | 76 frequency multiplication | | | | 77 frequency multiplication | | | | 78 frequency multiplication | | |
| 1080I_60 HZ_8 bit_ 74.33 MHZ | | 75 frequency | | 76 frequency | | | | 77 frequency | | | | 78 frequency | | |

TABLE 2-continued

| | | | | |
|---|---|---|---|---|
| 1080P_30 HZ_8 bit_ 74.33 MHZ | 75 frequency multiplication | 76 frequency multiplication | 77 frequency multiplication | 78 frequency multiplication |
| 1080P_60 HZ_8 bit_ 148.67 MHZ | | 38 frequency multiplication | | 39 frequency multiplication |
| 2160P_30 HZ_10 bit_ 92.83 MHZ | 60 frequency multiplication | 61 frequency multiplication | 62 frequency multiplication | |
| 2160P_60 HZ_10 bit_ 92.83 MHZ | 60 frequency multiplication | 61 frequency multiplication | 62 frequency multiplication | |
| 2160P_30 HZ_8 bit_ 297.00 MHZ | | 19 frequency multiplication | | |
| 2160P_60 HZ_8 bit_ 297.00 MHZ | | 19 frequency multiplication | | |

It may be learned from Table 2 that, when an HDMI signal is of different resolution, frequency multiplication of a clock signal affects a radio channel in a 5G Wi-Fi frequency band. As shown in Table 2, when the HDMI port outputs a signal of 720P_60 HZ_8 bit, frequency of 70 frequency multiplication of an HDMI clock signal is located on channel 40 of the Wi-Fi 5G frequency band. In this case, if the set-top box product uses channel 40 to transmit data with the AP and perform video playing, wireless transmission is greatly affected, which causes problems in video playing.

Figure 4:
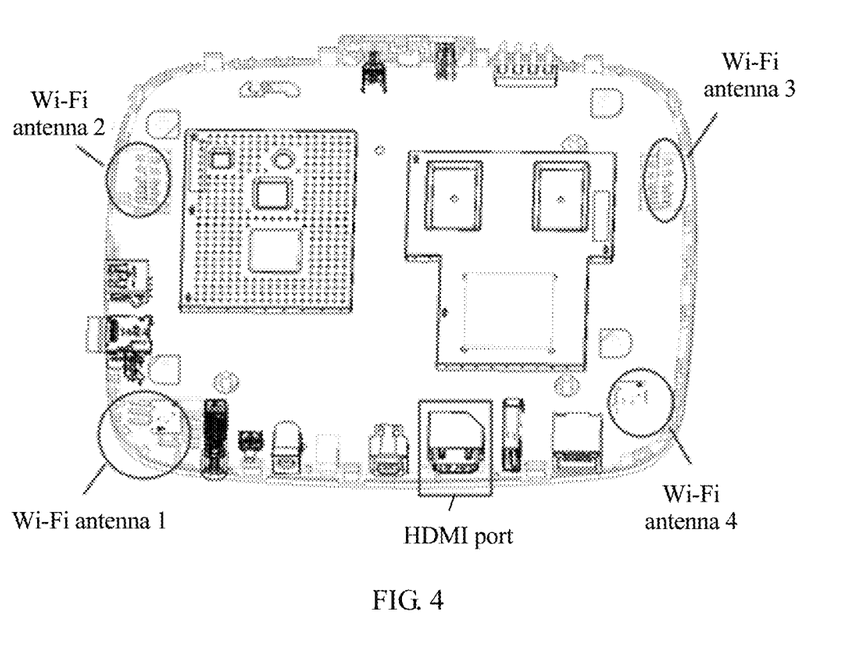
FIG. 4 is an internal layout diagram of a multi-antenna Wi-Fi (4T4R) set-top box product according to an embodiment of the present disclosure.

Currently, interference from an HDMI signal to Wi-Fi is mostly resolved by shielding an interference source. For example, interference to the Wi-Fi signal is reduced by adding a shielding case at an HDMI signal cable part. Alternatively, electrically conductive foam is used to increase contact, thereby reducing noise radiation. These methods first increase hardware complexity, and increase product production costs and material costs. In this embodiment of the present disclosure, based on whether a Wi-Fi signal is interfered by an HDMI signal and which Wi-Fi antenna is most greatly interfered by the HDMI signal, it is determined, by using software, whether the HDMI signal interferes with the Wi-Fi signal. If interference exists, the antenna most greatly interfered by the HDMI signal is disabled (if no interference exists, the antenna is then enabled), so as to eliminate the interference and increase a Wi-Fi throughput. FIG. 4 is a typical internal layout diagram of a multiple-antenna Wi-Fi (4T4R) set-top box product. To ensure consistency of Wi-Fi performance in all respects (a field pattern is round enough) and that Wi-Fi performance has no weakness at all 360 degrees, four Wi-Fi antennas are arranged at four corners of the set-top box, and distances between the antennas are as long as possible. In this way, it is unavoidable that one of the antennas is relatively close to the HDMI port and is interfered greatly, thereby affecting entire Wi-Fi performance. This antenna can be determined by using a testing tool to test a noise value received by each antenna. In FIG. 4, a Wi-Fi antenna 4 is the closest to the HDMI port, and therefore, the Wi-Fi antenna 4 is most greatly interfered by an HDMI signal.

In this embodiment of the present disclosure, an interference scenario (video resolution and Wi-Fi channel) can be determined, and an interfered object (Wi-Fi antenna) can also be determined. In this way, the interference scenario can be determined by using software, and a most greatly interfered antenna can be dynamically disabled, so that interference from the HDMI signal to the Wi-Fi signal can be reduced without increasing hardware costs, Wi-Fi performance is improved. Entire switching for avoiding interference is performed at background software, and user experience is not affected.

Figure 5:
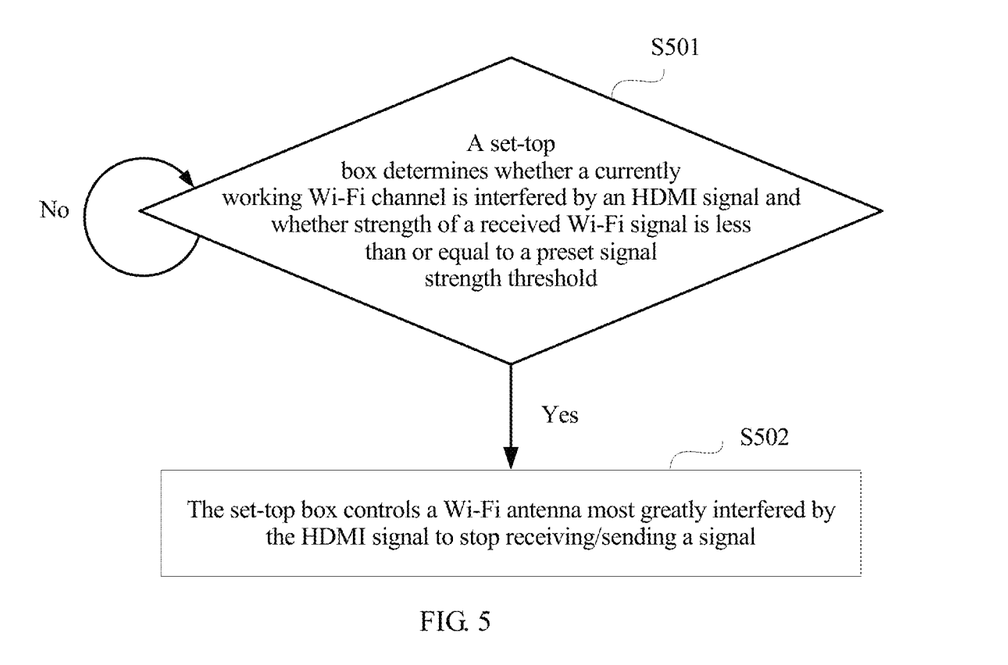
FIG. 5 is a schematic flowchart of a method for improving Wi-Fi performance according to an embodiment of the present disclosure.

Based on the scenario architecture shown in FIG. 1, a method for improving Wi-Fi performance according to an embodiment of the present disclosure is described with reference to FIG. 5. As shown in FIG. 5, the method includes the following steps.

S501: A set-top box determines whether a currently working Wi-Fi channel is interfered by an HDMI signal, and whether strength of a received Wi-Fi signal is less than or equal to a preset signal strength threshold; and if both determined results are yes, performs step S502; otherwise, continually performs this step.

In this embodiment of the present disclosure, the set-top box is configured with both a Wi-Fi module and an HDMI port. First, the set-top box is connected to an AP. Specifically, refer to FIG. 6, which is a schematic diagram of a process in which the set-top box establishes a connection to the AP. The process includes the following steps: Step 1: The AP periodically broadcasts a beacon (Beacon) frame (a beacon frame is a Wi-Fi management frame, and includes channel information of the AP), and the set-top box receives the beacon frame broadcast by the AP. Step 2: The set-top box sends a sounding request frame to the AP Step 3: The AP sends a sounding response frame to the set-top box. Step 4: If authentication is required, the AP can attempt to authenticate the set-top box. If authentication succeeds, the following process continues. Step 5: The set-top box sends an association request to the AP and the AP completes a connection to the set-top box. So far, the set-top box and the AP can communicate with each other. This process belongs to the prior art, and details are not described herein.

Figure 6:
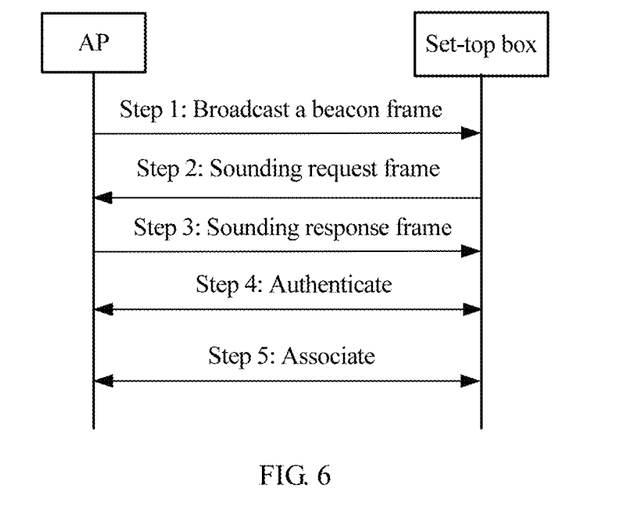
FIG. 6 is a schematic flowchart of establishing a connection between a set-top box and an AP according to an embodiment of the present disclosure.

After receiving the beacon frame, the set-top box analyzes the beacon frame, and extracts information about the currently working Wi-Fi channel from the beacon frame. For example, the set-top box extracts, from the beacon frame, the currently working Wi-Fi channel is channel 40. The set-top box compares the currently working Wi-Fi channel with a prestored list of Wi-Fi channels interfered by an HDMI signal (for a list of 5G Wi-Fi channels interfered by an HDMI signal, refer to Table 2, and a list of 2.4G Wi-Fi channels interfered by an HDMI signal is similar, details are not described herein), so as to determine whether the currently working Wi-Fi channel is interfered by the HDMI signal. For example, when the HDMI port of the set-top box outputs a signal with a resolution of 720P and frequency multiplication of an HDMI clock signal is 70 frequency multiplication, the set-top box may determine, by querying the foregoing list, that frequency of the HDMI clock signal is located on channel 40 of a Wi-Fi 5G frequency band, and the currently working Wi-Fi channel of the set-top box is exactly channel 40. Therefore, it may be determined that the currently working Wi-Fi channel is interfered by the HDMI signal.

In addition to detecting whether the currently working Wi-Fi channel is interfered by the HDMI signal, the set-top box further needs to detect whether signal strength of a received signal from the AP is less than or equal to the preset signal strength threshold. The signal strength may be a received signal strength indicator (RSSI). The preset signal strength threshold herein may be −65 dbm, or may certainly be another value. This is not specifically limited in this embodiment of the present disclosure.

When determining that the foregoing two conditions are both met, the set-top box considers that the Wi-Fi signal of the set-top box is interfered by the HDMI signal, and a Wi-Fi antenna most greatly interfered by the HDMI signal needs to be disabled, so as to reduce interference. Disabling the Wi-Fi antenna means controlling the antenna to stop receiving and sending a Wi-Fi signal, and the Wi-Fi antenna does not perform signal receiving and sending any more. For example, as shown in FIG. 3, when determining that the foregoing two conditions are both met, the set-top box switches from a 4-antenna transmit/receive mode to a 3-antenna transmit/receive mode, that is, the set-top box disables the Wi-Fi antenna 4 closest to the HDMI port. If one or both of the foregoing two conditions is/are not met, the set-top box considers that interference is very weak and does not affect user experience, and no antenna needs to be disabled. For example, referring to FIG. 3, when determining that only one of the foregoing two conditions is met, the set-top box does not need to disable any antenna, and continues to maintain a 4-antenna transmit/receive mode.

S502: The set-top box controls a Wi-Fi antenna most greatly interfered by the HDMI signal to stop receiving/sending a signal.

In this embodiment of the present disclosure, it may be deter pined, based on a distance, which Wi-Fi antenna is the antenna most greatly interfered by the HDMI signal, that is, the Wi-Fi antenna closest to the HDMI port is the antenna most greatly interfered by the HDMI signal. Certainly, there may be another manner of determining which Wi-Fi antenna is the antenna most greatly interfered by the HDMI signal. This is not specifically limited in this embodiment of the present disclosure. For example, it may be determined, by detecting strength of an HDMI interference signal received by each antenna, that an antenna that receives the strongest interference signal is the antenna most greatly interfered by the HDMI signal. When determining that the foregoing two conditions are both met, the set-top box disables receiving of the antenna closest to the HDMI port by writing a control register of a related receiving module in a Wi-Fi module, that is, the set-top box discards noise data received by the antenna, and reads only effective signals received by other antennas, to artificially increase a signal-to-noise ratio, thereby greatly improving Wi-Fi performance.

Optionally, after switching from the 4-antenna transmit/receive mode to the 3-antenna transmit/receive mode, the set-top box may further continue to detect the foregoing two conditions once every preset time period. If the foregoing two conditions are still met, the set-top box continues to maintain the 3-antenna transmit/receive mode. If one or both of the foregoing conditions is/are not met, the set-top box controls the disabled Wi-Fi antenna to work again, and continues to maintain the 4-antenna transmit/receive mode. The preset time period herein may be 5 minutes, 10 minutes, or another value. This is not specifically limited in this embodiment of the present disclosure.

Optionally, if the set-top box is powered off and restarted, or is reconnected after disconnecting from a Wi-Fi network, the entire process shown in FIG. 5 is repeated to ensure optimal user experience.

According to this embodiment of the present disclosure, the set-top box may dynamically adjust an antenna, so as to enhance interference immunity of an entire system. Compared with a conventional hardware shielding manner, this embodiment of the present disclosure does not require any additional shielding case or device, so that hardware costs are reduced, and Wi-Fi performance can be improved without increasing hardware costs and hardware complexity. Compared with a conventional manner of keeping an antenna away from an HDMI signal cable and a connector, in this embodiment of the present disclosure, a size of the set-top box does not need to be additionally enlarged, so that hardware costs are reduced, the set-top box conforms to a technical trend of miniaturization of a box-type terminal device, and comprehensive product competitiveness is improved. In addition, even if it is found, in a product with finalized hardware, that a Wi-Fi signal is interfered by an HDMI signal, the interference problem can be resolved according to this embodiment of the present disclosure. Furthermore, operation software in this embodiment of the present disclosure runs in background, and user experience is not affected. When this solution is practically tested and verified on a product, the following result is obtained: In a case of HDMI interference, 4-antenna throughput data is 25-40 Mbps. After an antenna closest to the HDMI port is disabled and a 3-antenna mode is used, Wi-Fi throughput data increases to 71-136 Mbps. Performance is greatly improved to support a 4K UHD video stream.

It should be noted that, because a Wi-Fi frequency band is wide and covers a 2.4G frequency band (2400 MHz to 2483.5 MHz) and a 5G frequency band (5170 MHz to 5835 MHz), an HDMI signal interferes with a Wi-Fi signal; in addition, another interface and device, such as a universal serial bus (USB) 3.0 Bluetooth, and long term evolution (LTE), may interfere with Wi-Fi signal. In these scenarios with interference, the solution in this embodiment of the present disclosure may also be used. A terminal identifies an interference scenario, and dynamically adjusts a most greatly interfered Wi-Fi antenna to avoid interference, thereby improving Wi-Fi performance and user experience.

Figure 7:
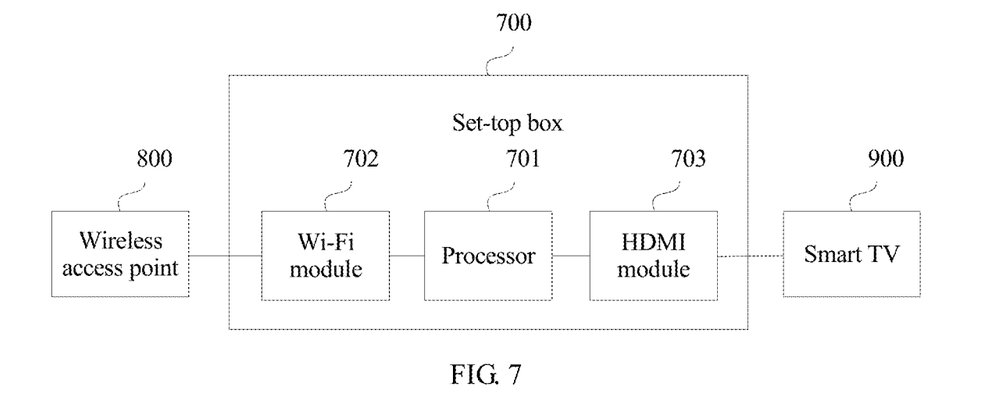
FIG. 7 is a schematic structural diagram of another set-top box according to an embodiment of the present disclosure.

FIG. 7 shows an embodiment of a set-top box, a wireless access point, and a smart TV according to an embodiment of the present disclosure, and a schematic structural diagram of a communications system that includes the set-top box, the wireless access point, and the smart TV As shown in FIG. 7, a Wi-Fi connection may exist between the set-top box 700 and the wireless access point 800, to implement Wi-Fi data communication between the set-top box 700 and the wireless access point 800. An HDMI connection may exist between the set-top box 700 and the smart TV 900, to implement HDMI data communication between the set-top box 700 and the smart TV 900. As shown in FIG. 7, the set-top box 700 may include: a processor 701, a Wi-Fi module 702, and an HDMI module 703.

The Wi-Fi module 702 is configured to transmit a Wi-Fi signal with the wireless access point 800;

the HDMI module 703 is configured to transmit an HDMI signal with the smart TV 900; and the processor 701 is configured to determine whether a currently working Wi-Fi channel of the Wi-Fi module 702 is interfered by an HDMI signal and whether strength of a received Wi-Fi signal is less than or equal to a preset signal strength threshold, where the set-top box is configured with a Wi-Fi module and an HDMI port.

If the currently working Wi-Fi channel of the Wi-Fi 702 is interfered by the HDMI signal and the strength of the received Wi-Fi signal is less than or equal to the preset signal strength threshold, the processing unit 701 is further configured to control a Wi-Fi antenna most greatly interfered by the HDMI signal to stop receiving/sending a signal.

Optionally, that the processor 701 is configured to determine whether the currently working Wi-Fi channel is interfered by the HDMI signal includes:

determining, based on the currently working Wi-Fi channel, resolution of a video signal output by the HDMI port of the set-top box, and frequency multiplication of a clock signal output by the HDMI port of the set-top box, whether the currently working Wi-Fi channel is interfered by the HDMI signal.

Optionally, the currently working Wi-Fi channel is determined by the set-top box based on a beacon frame sent by the wireless access point.

Optionally, the Wi-Fi antenna most greatly interfered by the HDMI signal is an antenna closest to the HDMI port of the set-top box.

Optionally, after controlling the Wi-Fi antenna most greatly interfered by the HDMI signal to stop receiving/sending a signal, the processor 701 is further configured to:

determine whether the currently working Wi-Fi channel is interfered by the HDMI signal and whether the strength of the received Wi-Fi signal is less than or equal to the preset signal strength threshold; and if the currently working Wi-Fi channel is not interfered by the HDMI signal, or the strength of the received Wi-Fi signal is greater than the preset signal strength threshold, control the Wi-Fi antenna most greatly interfered by the HDMI signal to start receiving/sending a signal.

A function of the processor 701 in this embodiment of the present disclosure is similar to that of the processor 201 in the embodiment shown in FIG. 2, a function of the Wi-Fi module 702 is similar to that of the Wi-Fi module 202 in the embodiment shown in FIG. 2, and the HDMI module 703 is similar to the HDMI port 203 in the embodiment shown in FIG. 2.

It should be noted that for content not mentioned and specific implementation of each functional unit in the embodiment in FIG. 7, refer to the embodiment in FIG. 5. Details are not described herein again.

In conclusion, according to the embodiments of the present disclosure, the terminal may dynamically adjust an antenna, so as to enhance interference immunity of an entire system. Compared with a conventional hardware shielding manner, the embodiments of the present disclosure do not require any additional shielding case or device, so that hardware costs are reduced, and Wi-Fi performance can be improved without increasing hardware costs and hardware complexity.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product in the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A method for improving wireless fidelity (Wi-Fi) performance, comprising:
    determining, by a terminal, whether a currently working Wi-Fi channel is interfered by a high definition multimedia (HDMI) signal based on the currently working Wi-Fi channel, resolution of a video signal output by the HDMI port of the terminal, and frequency multiplication of a clock signal output by the HDMI port of the terminal;
    determining whether a strength of a received Wi-Fi signal is less than or equal to a preset signal strength threshold, wherein the terminal is configured with a Wi-Fi module and an HDMI port; and
    if the currently working Wi-Fi channel is interfered by the HDMI signal and the strength of the received Wi-Fi signal is less than or equal to the preset signal strength threshold, controlling, by the terminal, a Wi-Fi antenna most greatly interfered by the HDMI signal to stop receiving/sending a signal.

2. The method according to claim 1, wherein the currently working Wi-Fi channel is determined by the terminal based on a beacon frame sent by a wireless access point.

3. The method according to claim 1, wherein the Wi-Fi antenna most greatly interfered by the HDMI signal is an antenna closest to the HDMI port of the terminal.

4. The method according to claim 1, wherein after the controlling, by the terminal, of the Wi-Fi antenna most greatly interfered by the HDMI signal to stop receiving/sending the signal, the method further comprises:
    determining, by the terminal, whether the currently working Wi-Fi channel is interfered by the HDMI signal and whether the strength of the received Wi-Fi signal is less than or equal to the preset signal strength threshold; and
    if the currently working Wi-Fi channel is not interfered by the HDMI signal, or the strength of the received Wi-Fi signal is greater than the preset signal strength threshold, controlling, by the terminal, the Wi-Fi antenna most greatly interfered by the HDMI signal to start receiving/sending a signal.

5. A terminal comprising a processor and a memory coupled with the processor, wherein the memory stores computer program code that, when the computer program code is executed by the processor, causes the terminal to:
    determine whether a currently working wireless fidelity channel is interfered by a high definition multimedia (HDMI) signal based on the currently working Wi-Fi channel, resolution of a video signal output by the HDMI port of the terminal, and frequency multiplication of a clock signal output by the HDMI port of the terminal;
    determine whether strength of a received Wi-Fi signal is less than or equal to a preset signal strength threshold, wherein the terminal is configured with a Wi-Fi module and an HDMI port; and
    if the currently working wireless fidelity Wi-Fi channel is interfered by the HDMI signal and the strength of the received Wi-Fi signal is less than or equal to the preset signal strength threshold, control a Wi-Fi antenna most greatly interfered by the HDMI signal to stop receiving/sending a signal.

6. The terminal according to claim 5, wherein the currently working Wi-Fi channel is determined by the terminal based on a beacon frame sent by a wireless access point.

7. The terminal according to claim 5, wherein the Wi-Fi antenna most greatly interfered by the HDMI signal is an antenna closest to the HDMI port of the terminal.

8. The terminal according to claim 5, wherein after the terminal is caused to control the Wi-Fi antenna most greatly interfered by the HDMI signal to stop receiving/sending a signal, the terminal is further caused to:
    determine whether the currently working Wi-Fi channel is interfered by the HDMI signal and whether the strength of the received Wi-Fi signal is less than or equal to the preset signal strength threshold; and
    if the currently working Wi-Fi channel is not interfered by the HDMI signal, or the strength of the received Wi-Fi signal is greater than the preset signal strength threshold, control the Wi-Fi antenna most greatly interfered by the HDMI signal to start receiving/sending a signal.

* * * * *